Aug. 29, 1939.  C. C. BENNETT  2,170,848
WHEEL BALANCE TESTER
Filed Sept. 26, 1936  3 Sheets-Sheet 1

Inventor
Claude C. Bennett
By Charles L. Reynolds
Attorney

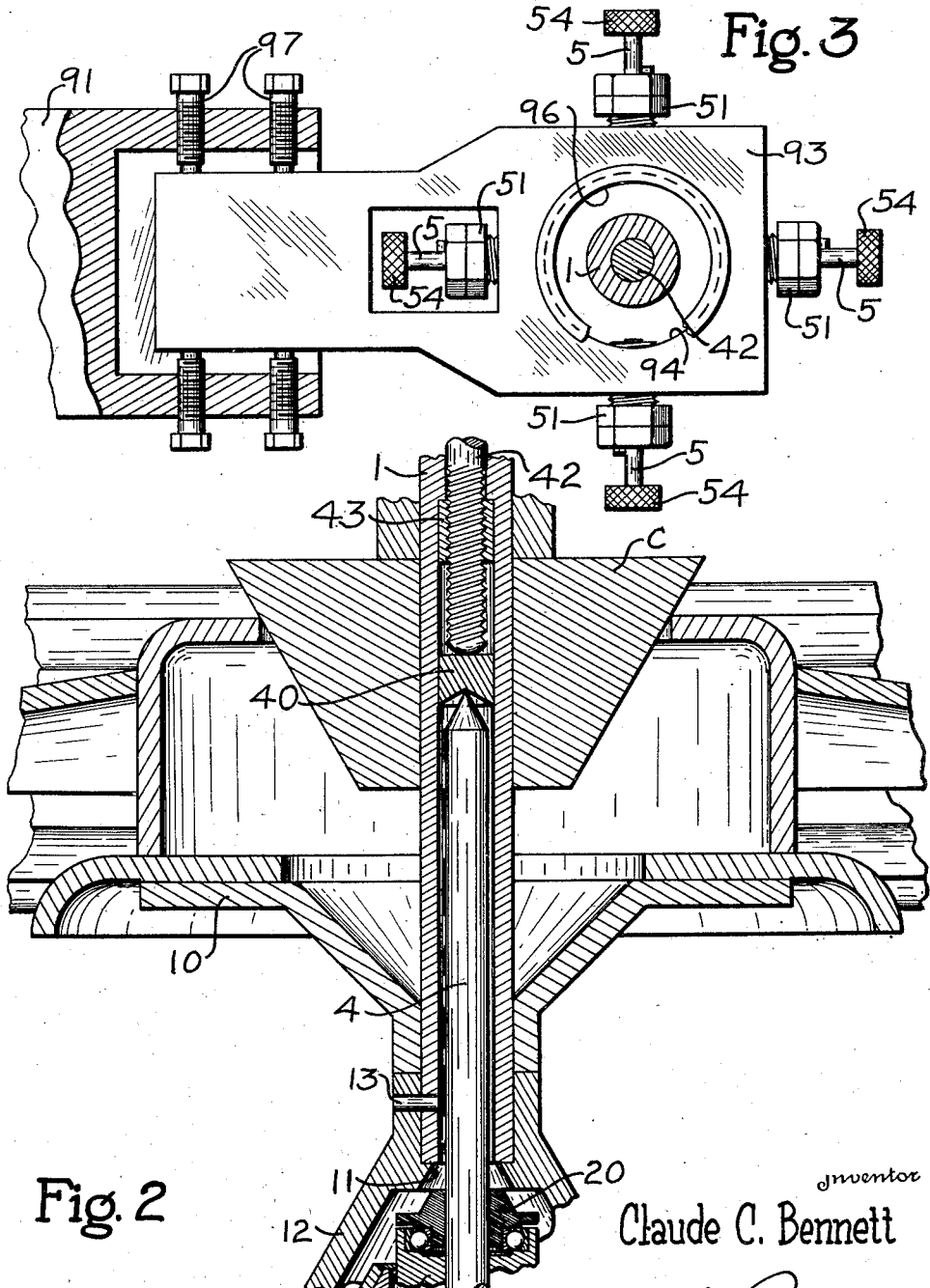

Aug. 29, 1939.  C. C. BENNETT  2,170,848
WHEEL BALANCE TESTER
Filed Sept. 26, 1936   3 Sheets-Sheet 3

Inventor
Claude C. Bennett
By Charles L. Reynolds
Attorney

Patented Aug. 29, 1939

2,170,848

UNITED STATES PATENT OFFICE 2,170,848

WHEEL BALANCE TESTER

Claude C. Bennett, South Bend, Ind., assignor to A. E. Feragen, Inc., Seattle, Wash., a corporation of Washington Application September 26, 1936, Serial No. 102,786

19 Claims. (Cl. 73—51)

My invention relates to devices for testing the balance of automobile wheels and like rotating bodies. It incorporates certain of the principles disclosed in my copending applications Serial Nos. 1,688, now Patent No. 2,075,421, and 1,687, now Patent No. 2,134,500, both filed January 14, 1935, in that there is combined in the present device a single machine whereby a wheel may be tested for dynamic unbalance and for static unbalance as well, without change in the position of the wheel, so that at one setting a wheel may be tested both dynamically and statically.

The primary object of the invention, as stated above, is to provide a single machine for accomplishing both types of balancing, and furthermore, to provide a machine whereby the location of the point of unbalance, in either test, may be determined with sufficient accuracy that the unbalance may be corrected.

A further object is to provide such a combination machine which can be adapted quickly and readily for testing for either type of unbalance, to the end that a given wheel may be tested both statically and dynamically and the points of unbalance in each case may be determined within a short period of time. Thus the machine may be adapted for testing in quantity manufacture, or may be employed in repair shops where numerous such wheels are to be tested.

A further object is to provide a machine of the general character indicated, which shall be simple and rugged in construction and reliable in operation, and in general to improve the form and arrangement of the parts of such a machine.

Other objects, particularly such as relate to structural details, will be understood as this specification progresses.

My invention comprises the novel machine, and the novel parts and combinations thereof, as shown in the accompanying drawings, and as will be made clear in the following specification and claims.

In the accompanying drawings, I have shown my invention embodied in a form such as is at present preferred by me.

Figure 2 is an axial section of the wheel support and associated parts arranged for static testing.

Figure 3 is a top plan view, with parts broken away and shown in section, showing the device for restraining the upper end of the spindle, with parts arranged for static balancing.

The operative parts of the machine are supported upon some convenient support or stand, indicated at 9. Secured upon or forming a part of the upper portion of the stand is an angled bracket 90 extending laterally and then upwardly, and carrying at its upward end an arm 91, which might be a part of the bracket 90, but which is preferably a separate arm pivotally supported from the bracket 90 at 92. The outer end of this arm 91 embraces the upper end of an upright spindle 1, and for convenience in applying a wheel W to the spindle and for removing it therefrom it is preferred that the arm 91 be hingedly mounted, as shown.

The spindle 1 and a table 10 constitute the wheel support, the table and spindle being secured together. The spindle is disposed centrally of the table and perpendicular to its wheel supporting surface. Any suitable means may be provided for centering a wheel upon the wheel support, as, for example, a cone C and a collar N secured upon the spindle, as for example by a set screw S (see Figure 1).

Figure 4:
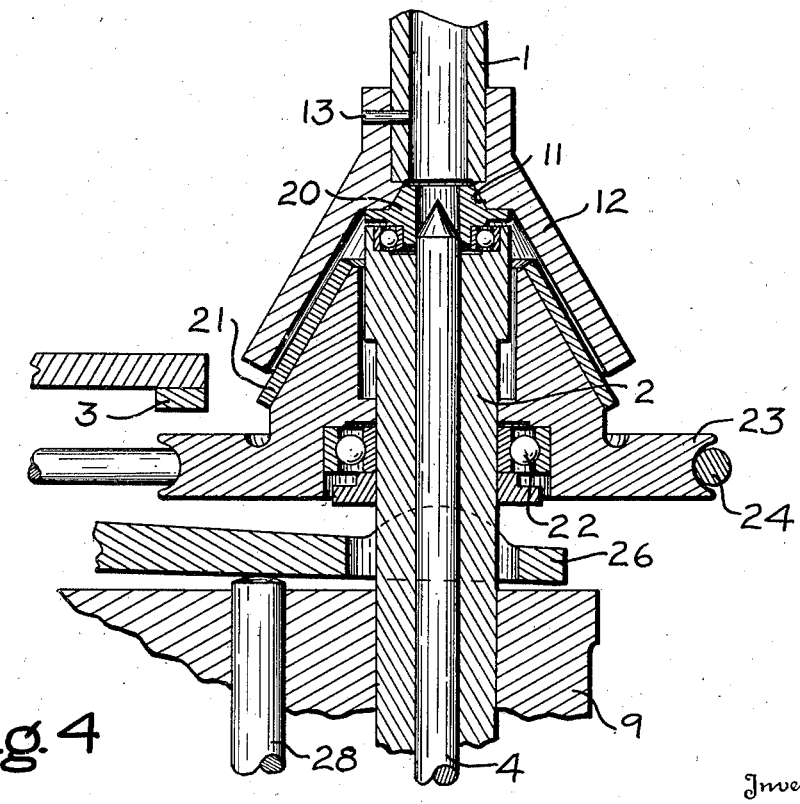
Figure 4 is an axial section of a part of the wheel support and associated parts, showing the parts arranged for dynamic testing.

To support the spindle and table in vertical position, and to permit its rotation while thus supported, for dynamic testing, a sleeve 2 may be provided, secured in the stand 9 in axial alignment with the spindle 1, this sleeve having journaled in its upper end a bearing member 20 having a conical surface fitting accurately a similarly coned surface 11 within a member 12 secured to this spindle, as by the pins 13 (see Figures 2 and 4). The engagement of the coned member 20 with the coned surface 11 disposes the spindle 1 precisely vertical, it being understood that the stand is suitably leveled when installed, and, all parts being properly balanced, the spindle will only depart from its vertical position while rotating if an unbalancing force is applied. Such an unbalanced force would be developed by a dynamically unbalanced mass in the wheel W. The wheel and spindle may be rotated by any suitable means. As one way of effecting rotation of the spindle, and consequently of the wheel, the member 12 is shown as constituting an element of a clutch, and cooperating with it is a clutch element 21 supported from and rotatable about the sleeve 2 by means of an antifriction bearing 22. A pulley 23 driven by a belt 24, extending over suitable idler pulleys 25 to a motor M constitutes a driving means. Engagement between the clutch elements 21 and 12 may be accomplished by an arm 26 pivoted at 27 upon the stand and engaging beneath the bearing 22, this arm being elevated by a push rod 28 actuated by a pedal 29.

A brake element 3 may be fixed in position immediately above the pulley 23. As the lifter arm 26 is first raised, the clutch elements 21 and 12 will be engaged to effect rotation of the wheel support, but further upward movement of the lifter arm 26 will effect engagement between the brake 3 and the pulley 23, and tend to stop rotation of the wheel support, the belt 24 slipping to permit such retardation.

The point of support of the wheel support, and a wheel thereon, is the coned surface 11. This is located somewhat beneath but close to the center of the gravity of the wheel support and wheel, so that it will reflect with sufficient accuracy any dynamic unbalance, but will not be unduly affected by pure static unbalance. Similarly, to test for static unbalance, a point of support is provided slightly above, but closely adjacent to the center of gravity referred to, and this is accomplished by providing a bearing member or block 40, associated with the wheel support, and a rod 4, the upper pointed end of which bears upon the block 40. Means are provided, as described below, whereby the wheel support may be raised from the coned member 20 to be supported upon the rod 4.

Figure 1:
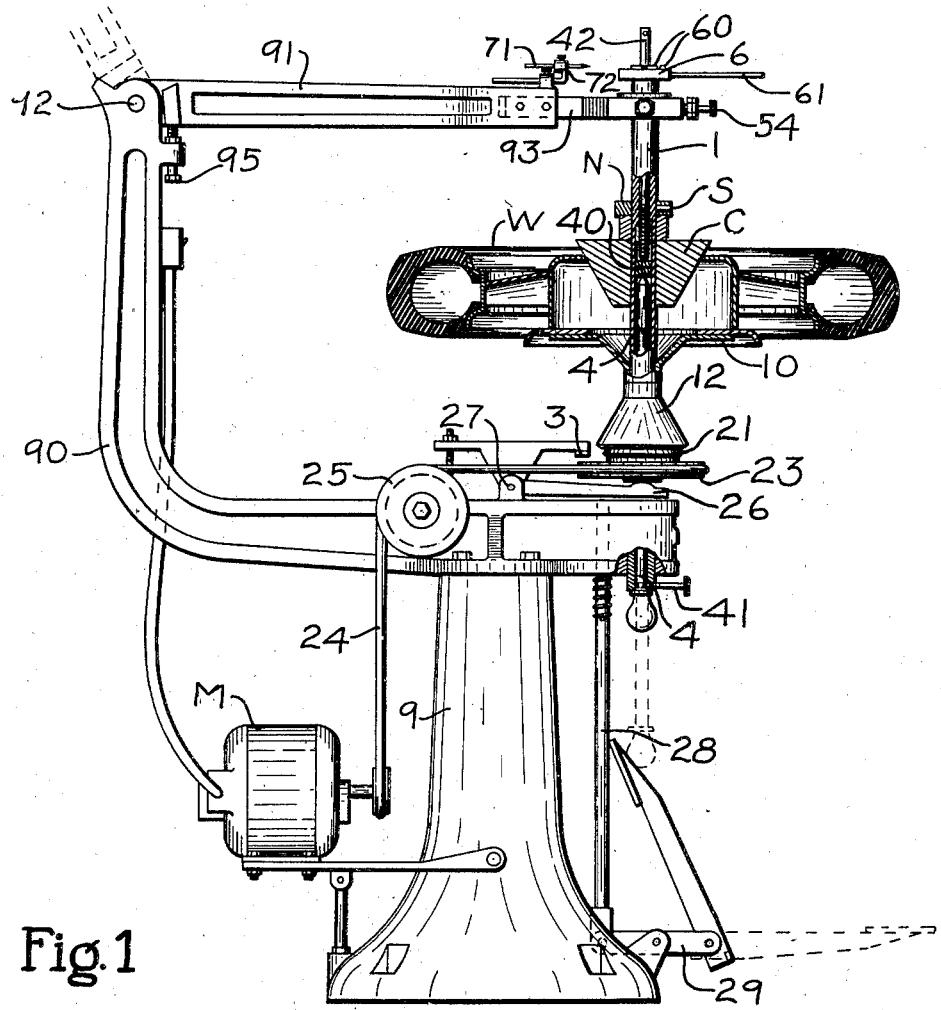
Figure 1 is in general a side elevation of the machine arranged for static balancing, a part of the wheel support and the wheel being shown in axial section.

The spindle 1 is made hollow and the block 40 is movable vertically within the bore of the spindle. The rod 4, when in operative position, extends upwardly into the bore of the spindle but has sufficient clearance to permit some oscillation of the spindle and wheel support with respect to the rod. However, the rod should not be in this position nor project appreciably within the bore of the spindle during dynamic tests, and it is therefore made to slide vertically within the sleeve 2, and to be suitably secured in upraised position, as by a set screw 41 engaging a circumferential groove of the rod 4 as shown in Figure 1, or when disengaged from the groove permitting the rod to be dropped down to the dash line position of Figure 1, or as shown in Figure 4.

The block 40 would normally be frictionally held in any given position within the spindle's bore, and is movable downwardly by positive means as, for example, by the screw 42 threaded in a nut 43 held within the bore of the spindle against upward movement, the lower end of the screw bearing against the block 40. The block is raised, when the screw is backed off, by upward pressure of the rod 4 and the downward pressure occasioned by the weight of the wheel support. Thus by unscrewing the screw 42, the block 40 would be raised sufficiently to permit the coned surface 11 seating upon the coned member 20, whereupon the rod 4 could be lowered; when it is desired to raise the wheel support upon the tip of the rod 4, the screw is turned down until the wheel support has been raised upon the block 40, and the coned surface 11 is raised from the cone 20 as shown in Figure 2. In this position, if static unbalance exists in the wheel, the wheel support will rock upon the tip of the rod 4, tilting the upper end of the spindle, and thus indicating static unbalance.

Figure 5:
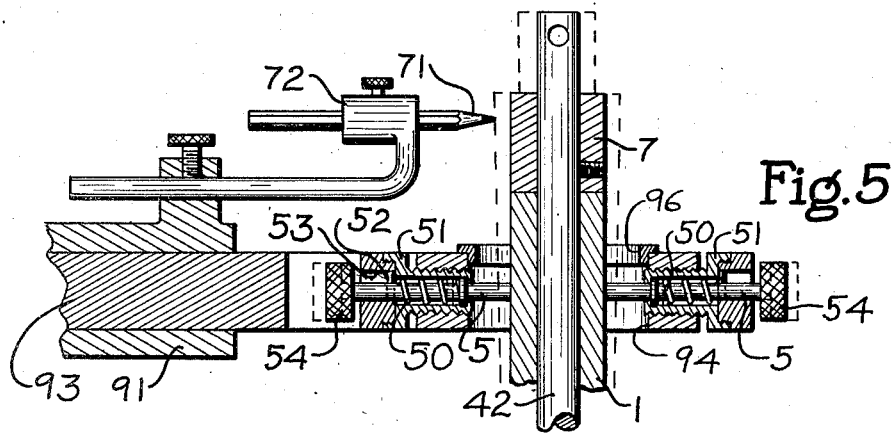
Figure 5 is a vertical section through the upper portion of the machine showing parts arranged for dynamic testing.

Restraint of the whipping movement of the spindle's upper end, when the wheel is dynamically unbalanced, is accomplished by a convenient means embracing the upper end of the spindle, as shown in Figure 5. The arm 91 is provided at its outer end with an extension 93 adjustable longitudinally and transversely, that is to say, in a horizontal plane, by set screws 97 (see Figure 3). Vertical adjustment may be accomplished by an adjusting screw 95 which engages the arm 91 (see Figure 1). The extension 93 is provided with an aperture 94 which embraces the upper end of the spindle. The extension should be so adjusted that the spindle is exactly centered in the aperture 94 when the spindle is precisely vertical. Further, to limit movement of the spindle during dynamic testing, contact pins 5 are provided, preferably four in number and spaced about the spindle and projecting into the aperture 94. Springs 50 press these contact pins inwardly, and a sleeve 51 within which the pins are guided and which limit the extent of their movement, may be threaded in or out to bring the pins, when pressed inward to the limit of their movement, exactly into contact with the spindle, to hold it central. These pins and their springs will normally hold the spindle sufficiently against too great whipping movement due to dynamic unbalance, but in order to further guard the spindle and to limit its movement the aperture may be surrounded and lined with a collar 96 of brass.

During static balance testing it is not desirable to have any pressure on the spindle, and the contact pins 5 are therefore provided with cross pins 52 movable in a slot 53 in the sleeve supporting these cross pins, whereby by outward movement of the pins, accomplished by grasping the head 54 thereof, and by slight turning movement when the cross pins 52 are clear of the slot 53, the contact pins 5 may be held out of engagement with the spindle, as shown in Figure 3. The spindle is precisely centered and should remain that way if the wheel and wheel support are in proper static balance, but if they are not precisely balanced the spindle will tilt in one direction or another.

As a means for testing static balance and determining the point of unbalance, I may provide an instrument such as is disclosed in my application Serial No. 1,688, now Patent No. 2,075,421, referred to above, and consisting of a block 6 having two bubble tubes 60 arranged at right angles to each other. The block 6 is apertured to be received upon the end of the spindle, and may be provided with a pointer 61. By observing the bubble tubes as the block 6 and pointer 61 are turned about the spindle, the point of static unbalance may be ascertained with sufficient accuracy, and in a short space of time.

In order to determine with sufficient accuracy the point of dynamic unbalance, I may provide a sleeve or collar 7 which may be fitted upon the upper end of the spindle, provided with a marking surface, for instance, a chromium plated surface. With this cooperates a pencil or marker 71 supported in a bracket 72 carried upon the arm 91. By adjusting the tip of the marker 71, while the spindle is rotating, so that it just touches the marking surface of the sleeve 7, a mark will be left thereon, which will indicate the location of the point of dynamic unbalance. It will be understood that the spindle rocks on the coned member 20 by reason of this dynamic unbalance.

When it is desired to test a wheel, the arm 91 is thrown upward into the dash line position indicated in Figure 1, a wheel is dropped over the spindle, or the spindle may be lifted and placed in proper relation to the wheel, and replaced. The arm 91 is then returned to its operative position and the rod 4 is then raised to its upper position, the block 40 is screwed down to lift the wheel support, and a test is made for static unbalance. This completed, the screw 42 is unscrewed to lower the wheel support back upon the cone 20. The rod 4 is dropped to its lower position and the wheel support is startd to rotating. The test is made for dynamic unbalance, the rotation is stopped, and the wheel is lifted off in a manner the reverse of its positioning upon the spindle. The entire operation can be accomplished in a short time and with a minimum of effort, and yet is sufficiently accurate for all practical purposes in the manufacture or servicing of automobiles.

What I claim as my invention is:

1. A wheel balance tester comprising a stand, means to support a wheel in horizontal position including a hollow spindle projecting above a wheel thus supported, and lying in such wheel's axis, a manually operated rod, guided within the stand and extendible within the spindle, for vertical movement between an upper and a lower position, which positions may be either within or without the spindle, means on the stand supporting the wheel support with its spindle coaxial with the rod, the latter when in its upper position projecting within the spindle's bore to a point above the center of gravity of the wheel support and a wheel thereon, and a member within the spindle's bore engageable by the upper end of the rod, when thus upraised, to constitute a tilting bearing for the wheel support.

2. A wheel balance tester comprising a stand, a rod guided therein for vertical movement between an upper and a lower position, means to support a wheel in horizontal position including a hollow spindle projecting above a wheel thus supported, and lying in such wheel's axis, means, including a sleeve topped by a conically shaped bearing member, on the stand supporting the wheel support with its spindle coaxial with the rod, the latter when in its upper position projecting within the spindle's bore to a point above the center of gravity of the wheel support and a wheel thereon, a bearing block member within the spindle's bore engageable by the upper end of the rod, when thus upraised, to constitute a tilting bearing for the wheel support, and means, including a screw and nut, to adjust said member axially of the spindle, to vary the distance from said tilting bearing to such center of gravity, or to relieve said member of the weight of the wheel support.

3. A wheel balance tester comprising a stand, a vertical rod guided therein for axial movement between an upper and a lower position, means to support a wheel in horizontal position including a hollow axially disposed spindle projecting above the wheel, means on the stand engageable with the wheel support to support it from below with the spindle vertical and coaxial with the rod, the latter when in its upper position projecting within the spindle's bore to a point above the center of gravity of the wheel support and a wheel thereon, means to rotate the wheel support, with the rod in its lower position and the wheel support resting on its supporting means, for tilting under the influence of dynamic unbalance, and a member within the spindle's bore engageable by the upper end of the rod, when in its upper position, to constitute a bearing whereon the wheel support may tilt under the influence of static unbalance.

4. A wheel balance tester comprising a stand, means to support a wheel in horizontal position including an upright spindle, supporting means for the wheel support including a rotatable conical member journaled in the stand, coaxially with the spindle, the wheel support having a complementally coned recess receiving the conical member to support the wheel support from below and to maintain the spindle vertical, and means, including a clutch element upon the wheel support and a complemental clutch element carried by the stand, to rotate the wheel support while the latter rests upon its conical supporting member, whereby the wheel support will tilt under the influence of dynamic unbalance.

5. A wheel balance tester comprising a stand, means to support a wheel in horizontal position including an upright spindle, supporting means for the wheel support including a rotatable conical member journaled in the stand, coaxially with the spindle, the wheel support having a complementally coned recess receiving the conical member to support the wheel support from below and to maintain the spindle vertical, and means, including a coaxial conical clutch element upon the wheel support, and a conical complemental clutch element journaled in the stand and movable axially to engage the first clutch element, to rotate the wheel support while the latter rests upon its conical supporting member, and to assist in maintaining the spindle vertical, whereby, upon disengagement of the clutch elements, the wheel support will tilt under the influence of any dynamic unbalance.

6. The combination of claim 4, the spindle and the conical supporting member being hollow, a bearing member disposed in the spindle's bore, above the center of gravity of the wheel support and a wheel thereon, and a rod coaxially disposed and guided in the stand for vertical movement through the conical supporting member and the spindle from a lower position to an upper position, wherein it engages said bearing member and supports the wheel support free from the conical supporting member, for tilting under the influence of any static unbalance.

7. The combination of claim 4, the spindle and the conical supporting member being hollow, a bearing member disposed in the spindle's bore, above the center of gravity of the wheel support and a wheel thereon, and a rod coaxially disposed and guided in the stand for vertical movement through the conical supporting member and the spindle from a lower position to an upper position, wherein it engages said bearing member, and means to move the bearing member axially of the spindle's bore to lift the wheel support from its conical supporting member and to support it, for tilting under the influence of any static unbalance, upon the rod.

8. A wheel balance tester comprising a stand, means to support a wheel in horizontal position including an upright hollow spindle, supporting means for the wheel support including a sleeve received in the stand and disposed coxially with the spindle, a conical member journaled for rotation at the upper end of said sleeve, and the wheel support having a complementally coned recess receiving the conical member to support the wheel support from below and to maintain the spindle vertical, a clutch element carried by the wheel support, a complemental driving clutch element journaled upon the sleeve and movable axially thereof to engage the first clutch element for rotation of the wheel support, a bearing member received in the spindle's bore, above the center of gravity of the wheel support and a wheel thereon, a rod slidably received in said sleeve for movement from a lower position, substantially clear of the spindle's bore, to an upper position in engagement with said bearing member, whereby to support the wheel support upon the rod for tilting.

9. A wheel balance tester comprising a stand, a vertical rod guided therein for axial movement between an upper and a lower position, means to support a wheel in horizontal position including a hollow axially disposed spindle projecting above the wheel, means on the stand engageable with the wheel support, adjacent the center of gravity of the wheel support and a wheel thereon, to support it from below with the spindle vertical and coaxial with the rod, means, including a clutch element upon the wheel support and a complemental clutch element journaled in the stand, to rotate the wheel support, with the rod in its lower position and the wheel support resting upon its supporting means, whereby the wheel support will tilt under the influence of dynamic unbalance, means to restrain such tilting of the upper end of the spindle, and a member carried by the spindle above the center of gravity of the wheel support and a wheel thereon, and engageable by said rod when in its upper position, to form a tilting bearing whereon the weight of the wheel support and wheel may be carried, free from the first-mentioned supporting means for the wheel support, for tilting under the influence of static unbalance.

10. A wheel balance tester comprising a stand, means to support a wheel in horizontal position including an upright spindle, means carried by the stand engaging the wheel support from below for its support, an arm carried by and angularly movable with respect to the stand in the plane thereof, and means carried by said arm embracing the upper end of the spindle to restrain its tilting.

11. A wheel balance tester comprising a stand, means to support a wheel in horizontal position including an upright spindle, means carried by the stand engaging the wheel support from below for its support and for tilting, pins radially and angularly disposed about the upper end of the spindle to restrain its tilting, means to withdraw said pins and to hold them withdrawn at will, and a circular bearing member embracing the spindle and disposed to limit tilting of the spindle when the pins are withdrawn.

12. A wheel balance tester comprising a stand, means to support a wheel in horizontal position including an upright spindle, means carried by the stand engaging the wheel support from below for its support and for tilting, pins radially and angularly disposed about the upper end of the spindle to restrain its tilting, springs pressing said pins inwardly, stops limiting inward movement of each pin, and means to adjust the positions of said stops to maintain the spindle vertical.

13. A wheel balance tester comprising a stand, means to support a wheel in horizontal position including an upright spindle, means carried by the stand engaging the wheel support from below for its support and for tilting, pins radially and angularly disposed about the upper end of the spindle to restrain its tilting, springs pressing said pins inwardly, stops limiting inward movement of each pin, means to adjust the positions of said stops to maintain the spindle vertical, means to withdraw said pins outwardly and to hold them withdrawn at will, to allow tilting of the spindle, and means to limit such tilting.

14. The combination of claim 12, including a head apertured to embrace the upper end of the spindle, the pins being mounted in said head, and means to support said head from the stand, and to adjust the same relative thereto.

15. A wheel balance tester comprising a stand, means to support a wheel thereon in a horizontal plane including an upright spindle formed and disposed to pass through the plane of the wheel and to lie in its axis, a bearing on the stand supporting the wheel support for rotation, said bearing including a conical support and the wheel support including a complemental conical member resting thereon to positively dispose and maintain the spindle vertical, said conical support and support member being constructed and arranged to permit the spindle to depart from such vertical position, during rapid rotation, under the influence of dynamic unbalance.

16. A wheel balance tester comprising a stand, means to support a wheel in horizontal position, said means including a spindle projecting above the wheel to be tested, means for raising and lowering the wheel support to alternately test the wheel for its static and dynamic balance, means on the stand engageable with the wheel support to rotate the wheel support and wheel to effect the dynamic test of the wheel, and means associated with the spindle for restricting oscillatory movement thereof.

17. A wheel balance tester comprising a stand, means to support a wheel in horizontal position including a hollow member projecting above the wheel to be tested, means for raising and lowering the wheel support to alternately test the wheel for its static and dynamic unbalance, means on the stand engageable with the wheel support to rotate the wheel support to effect the dynamic test of the wheel, and means cooperating with said hollow member of the wheel support for steadying the same during the testing of the wheel for dynamic unbalance, said latter means also serving as a support for indicator means to determine the degree of either static or dynamic unbalance.

18. A wheel balance tester comprising a stand, an adjustable rod guided within the stand for vertical movement between an upper and a lower position, means to support a wheel in horizontal position including a hollow spindle projecting above a wheel thus supported, and lying in such wheel's axis, means on the stand supporting the wheel support with its spindle coaxial with the rod when the rod is in its lower position, said rod when in its upper position projecting within the spindle's bore to a point above the center of gravity of the wheel support and a wheel thereon, and a bodily movable block-like member within the spindle's bore engageable by the upper end of the rod, when thus upraised, to constitute a tilting bearing for the wheel support.

19. A wheel balance tester comprising a stand, means to support a wheel in horizontal position including an upright spindle, means carried by the stand engaging the wheel support from below for its support and for tilting, support means carried by the stand and embracing said spindle, pins, mounted in said second-mentioned means, radially and angularly disposed about the upper end of the spindle to restrain its tilting, means to withdraw said pins and to hold them withdrawn at will, and a circular bearing member embracing the spindle and disposed to limit tilting of the spindle when the pins are withdrawn, and a marker disposed adjacent the upper end of the spindle and mounted on said second-mentioned means, and a cylinder adapted to be mounted upon the spindle for engagement by said marker, to indicate the location of an unbalanced mass.

CLAUDE C. BENNETT.